United States Patent
Bambrick

(10) Patent No.: US 10,284,926 B2
(45) Date of Patent: May 7, 2019

(54) DEVICES, METHODS, AND SYSTEMS FOR MONITORING OF ENCLOSED ENVIRONMENTS

(71) Applicant: Laser Light Solutions LLC, Somerset, NJ (US)

(72) Inventor: David Bambrick, Somerset, NJ (US)

(73) Assignee: Laser Light Solutions, Somerset, NJ (US)

( * ) Notice: Subject to any disclaimer, the term of this patent is extended or adjusted under 35 U.S.C. 154(b) by 0 days.

(21) Appl. No.: 15/670,457

(22) Filed: Aug. 7, 2017

(65) Prior Publication Data

US 2019/0045280 A1    Feb. 7, 2019

(51) Int. Cl.
*G08C 19/04* (2006.01)
*H04Q 9/00* (2006.01)

(52) U.S. Cl.
CPC ........... *H04Q 9/00* (2013.01); *H04Q 2209/40* (2013.01); *H04Q 2209/883* (2013.01)

(58) Field of Classification Search
CPC . H04Q 9/00; H04Q 2209/40; H04Q 2209/883
USPC .................................... 340/870.39
See application file for complete search history.

(56) References Cited

U.S. PATENT DOCUMENTS

| | | | |
|---|---|---|---|
| 9,386,140 B2 | 7/2016 | Logan et al. | |
| 9,509,828 B2 | 11/2016 | Lee et al. | |
| 2003/0163287 A1* | 8/2003 | Vock | A43B 3/0005 702/187 |
| 2004/0181703 A1* | 9/2004 | Lilja | H02J 9/005 713/324 |
| 2005/0039465 A1* | 2/2005 | Welch | F25B 21/04 62/3.7 |
| 2005/0244309 A1* | 11/2005 | Wang | B01D 53/007 422/186.3 |

(Continued)

FOREIGN PATENT DOCUMENTS

CN         204455651 U      7/2015

OTHER PUBLICATIONS

Smart Home Adaptar (Laundry) Home Appliances Accessories—HD39J1230GW—Samsung USA downloaded from: http://www.samsung.com/us/home-appliances/home-appliances-accessories/washers-dryers/smart-home-adaptar-laundry-hd39j1230gw; pp. 1-14.

*Primary Examiner* — Kerri L McNally
*Assistant Examiner* — Thang D Tran
(74) *Attorney, Agent, or Firm* — Fox Rothschild LLP

(57) ABSTRACT

A remote sensor device, method and system may include a casing housing an electronic circuit mounted that may include at least one environmental data sensor that generates environmental data based on one or more environmental conditions of air surrounding the environmental data sensor. The electronic circuit may also include a processor, a power source, a wireless transceiver, and a programmable memory. The environmental data generated by the at least one environmental sensor may be transmitted the environmental data via the wireless transmitter to a receiving device. The remote sensor device may also have a sensor to measure movement and the remote sensor device and/or portions of the circuit may enter a deep sleep mode when the motion is below a threshold level of motion and exit the deep sleep mode when the motion of the sensor device is at or above a threshold level of motion.

20 Claims, 18 Drawing Sheets

(56) References Cited

U.S. PATENT DOCUMENTS

| | | | |
|---|---|---|---|
| 2009/0044422 A1* | 2/2009 | Moschuetz | D06F 43/005 34/544 |
| 2009/0090704 A1* | 4/2009 | Halpin | H04Q 9/00 219/209 |
| 2009/0178295 A1* | 7/2009 | He | D06F 58/203 34/380 |
| 2010/0163549 A1* | 7/2010 | Gagas | H05B 6/1209 219/622 |
| 2011/0168712 A1* | 7/2011 | Bailey | B65D 83/0409 220/326 |
| 2012/0068848 A1* | 3/2012 | Campbell | A61B 5/0008 340/573.1 |
| 2012/0278009 A1* | 11/2012 | Matthes | G01L 19/0645 702/52 |
| 2013/0158686 A1* | 6/2013 | Zhang | G01C 22/006 700/91 |
| 2014/0028830 A1* | 1/2014 | Kieffer | H04N 7/181 348/82 |
| 2014/0085093 A1* | 3/2014 | Mittleman | H04L 12/282 340/628 |
| 2014/0182313 A1* | 7/2014 | Giacomini | G05D 23/19 62/56 |
| 2014/0300284 A1* | 10/2014 | Lee | H05B 33/086 315/186 |
| 2015/0061862 A1* | 3/2015 | Lee | H04M 1/7253 340/539.11 |
| 2015/0226481 A1* | 8/2015 | Marchiori | F26B 5/12 34/412 |
| 2015/0237917 A1* | 8/2015 | Lord | A24F 47/008 131/328 |
| 2016/0036958 A1* | 2/2016 | Logan | H04W 4/80 455/414.1 |
| 2016/0066068 A1* | 3/2016 | Schultz | F24F 11/00 340/870.07 |
| 2016/0326688 A1* | 11/2016 | Choi | D06F 58/28 |
| 2016/0345081 A1* | 11/2016 | Yamada | H04Q 9/00 |
| 2016/0346416 A1* | 12/2016 | Schwartz | A61L 2/18 |
| 2017/0039842 A1* | 2/2017 | Matsuoka | G08B 21/182 |
| 2017/0284690 A1* | 10/2017 | Lipanov | F24F 11/006 |

* cited by examiner

DEVICES, METHODS, AND SYSTEMS FOR MONITORING OF ENCLOSED ENVIRONMENTS

FIELD OF THE DISCLOSURE

The field of the present disclosure is in remote monitoring of enclosed environments.

BACKGROUND

Modern computer and communications technology has allowed home appliances to become "smart" with on board software and hardware that can assist the user to more effectively utilize the appliance. However, there are still substantial numbers of "dumb" appliances sold and/or in service that do not provide the benefits of advances in computer and communications technologies. Thus, there is a need for systems, devices, and methods that allow a user of, for example, a household clothes dryer to provide data on its operating parameters.

SUMMARY

A remote sensor device may include a casing housing an electronic circuit mounted inside the casing and capable of operating in high temperatures. The electronic circuit may include at least one environmental data sensor that generates environmental data based on one or more environmental conditions of air surrounding the environmental data sensor. The electronic circuit may also include a processor, a power source, a wireless transceiver, and a programmable memory storing program instructions. The program instructions may cause the processor to process environmental data generated by the at least one environmental sensor, and transmit the environmental data via the wireless transmitter to a receiving device. The environmental data may be at least one of the group selected from temperature data, humidity data, or combinations thereof. The remote sensor device may also have a sensor to measure movement and the remote sensor device and/or portions of the circuit may enter a deep sleep mode when the motion is below a threshold level of motion and exit the deep sleep mode and enter an active mode when the motion of the sensor device is at or above a threshold level of motion. The remote sensor device may also maintain the deep sleep mode of remote sensor device in response to that the motion of the remote sensor device being below the threshold level of motion.

A method of monitoring environmental conditions within a chamber may include placing a remote sensor device inside the chamber, wherein the remote monitoring device includes at least one environmental data sensor and a motion sensor; detecting, by the motion sensor, motion of the remote sensor device. The remote sensor may be independent of the chamber. If the motion is above a threshold level, activating the remote sensor device from a deep sleep mode to an active mode; applying power, from a power source associated with the remote sensor device, to the at least one environmental data sensor; receiving, from the environmental data sensor, environmental data based on one or more environmental conditions of air immediately surrounding the environmental data sensor; and wirelessly transmitting the environmental data via a wireless transmitter associated with the remote sensor device to a receiving device that enables a user of the receiving device to monitor the environmental conditions inside the chamber.

A system for monitoring environmental conditions inside a chamber may include a remote sensor device comprising at least one environmental data sensor that generates environmental data based on one or more environmental conditions of air immediately surrounding the remote sensor device. A wireless transmitter associated with the remote sensor device may be configured to wirelessly transmit environmental data generated by the at least one environmental data sensor. A receiving device comprising a processor configured to receive the wirelessly transmitted environmental data and to enable a user of the receiving device to monitor the environmental conditions inside the chamber. The system may also include a hub device configured to relay signals from the remote sensor device to the receiving device.

BRIEF DESCRIPTION OF THE DRAWINGS

The various aspects, features and embodiments of the monitoring devices, methods, and systems as disclosed herein will be better understood when read in conjunction with the drawings provided. Embodiments are provided in the drawings for the purposes of illustrating aspects, features and/or various embodiments of the monitoring devices, methods, and systems, but the claims should not be limited to the precise arrangement, structures, subassemblies, features, embodiments, aspects, and devices shown, and the arrangements, structures, subassemblies, features, embodiments, aspects, and devices shown may be used singularly or in combination with other arrangements, structures, subassemblies, features, embodiments, aspects, and devices. The drawings are not necessarily to scale and are not in any way intended to limit the scope of the claims, but merely are presented to illustrate and describe various embodiments, aspects and features of monitoring devices, methods, and systems to one of ordinary skill in the art.

DETAILED DESCRIPTION

Figure 1:
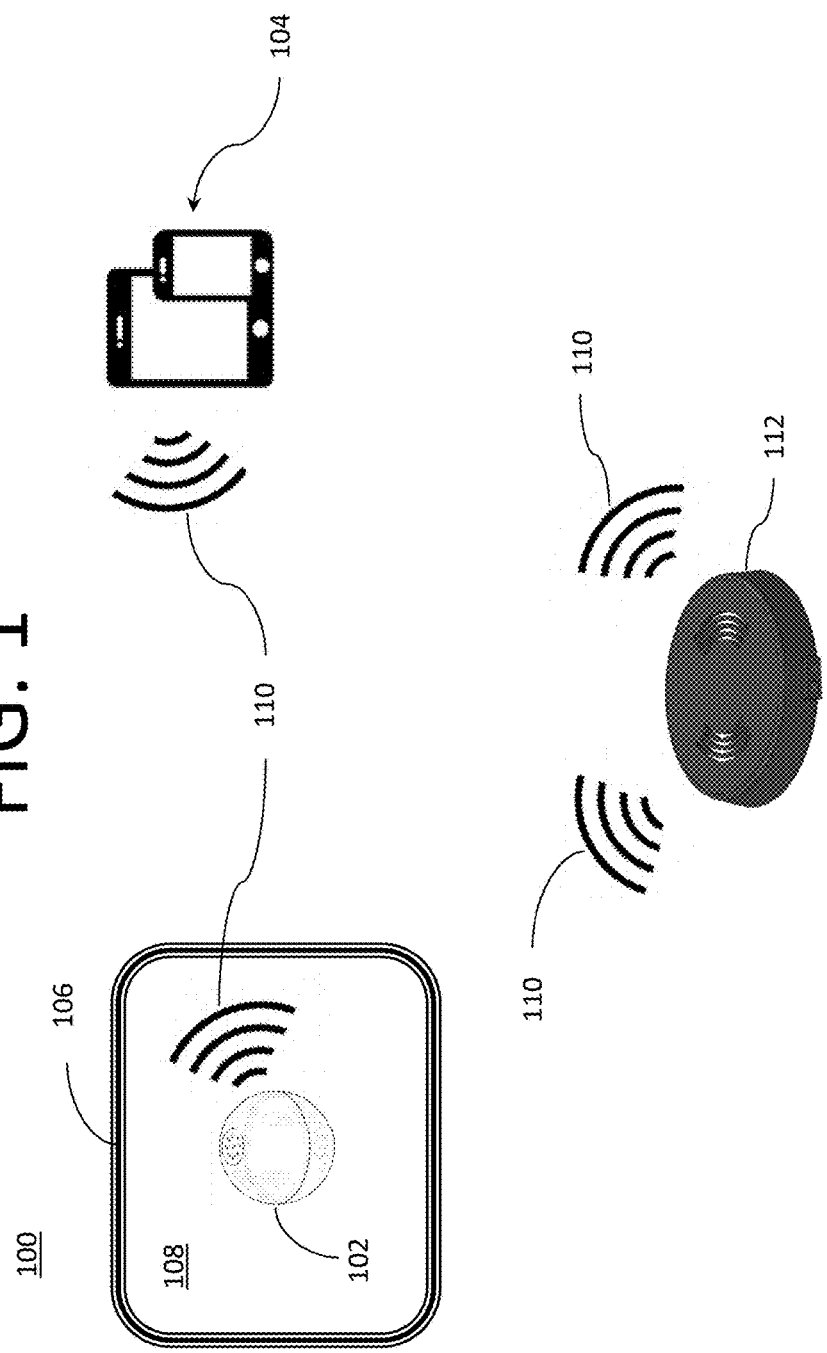
FIG. 1 is a system diagram that shows an example monitoring system.

In the following detailed description, numerous details are set forth in order to provide an understanding of the monitoring devices and systems, and their method of operation and use. However, it will be understood by those skilled in the art that the different and numerous embodiments of the monitoring devices and systems, their method of operation and use may be practiced without these specific details, and the claims and invention should not be limited to the embodiments, subassemblies, or the features or details specifically described and shown herein. The description provided herein is directed to one of ordinary skill in the art and in circumstances, well-known methods, procedures, manufacturing techniques, components, and assemblies have not been described in detail so as not to obscure other aspects, or features of the monitoring devices, methods, and systems.

Accordingly, it will be understood that the components, aspects, features, elements, and subassemblies of the embodiments, as generally described and illustrated in the figures herein, can be arranged and designed in a variety of different configurations in addition to the described embodiments. It is to be understood that the monitoring devices, methods, and systems may be used with many additions, substitutions, or modifications of form, structure, arrangement, proportions, materials, and components, which may be particularly adapted to specific environments and operative requirements without departing from the spirit and scope of the invention. The following descriptions are intended only by way of example, and simply illustrate certain selected embodiments of monitoring devices, methods, and systems. For example, while the monitoring devices, methods, and systems are shown and described in examples with particular reference to its use in monitoring home appliances, specifically a clothes dryer, it should be understood that the monitoring devices, methods, and systems, and aspects thereof may have other applications as well. The claims appended hereto will set forth the claimed invention and should be broadly construed to cover monitoring devices, methods, and/or systems, unless otherwise clearly indicated to be more narrowly construed to exclude embodiments, elements and/or features of the monitoring devices, methods, and/or systems.

Throughout the present application, reference numbers are used to indicate a generic element, mechanism, assembly, or feature of the monitoring devices, methods, and/or systems. The same reference number may be used to indicate elements, mechanisms, assemblies, or features that are not identical in form, shape, structure, etc., yet which provide similar functions or benefits. Additional reference characters (such as letters, primes, or superscripts, as opposed to numbers) may be used to differentiate similar elements or features from one another. It should be understood that for ease of description the disclosure does not always refer to or list all the components of the monitoring devices, methods, and/or systems, and that a singular reference to an element, member, or structure, e.g., a singular reference to an indentation, may be a reference to one or more such elements, unless the context indicates otherwise.

In the following description of various embodiments of the monitoring devices, methods, and/or systems, it will be appreciated that all directional references (e.g., proximal, distal, upper, lower, upward, downward, left, right, lateral, longitudinal, front, rear, back, top, bottom, above, below, vertical, horizontal, radial, axial, interior, exterior, clockwise, and counterclockwise) are only used for identification purposes to aid the reader's understanding of the present disclosure unless indicated otherwise in the claims, and do not create limitations, particularly as to the position, orientation, or use in this disclosure. Features described with respect to one embodiment typically may be applied to another embodiment, whether or not explicitly indicated.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and/or in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Embodiments of the present invention are not limited to the particular methodology, uses, and applications described herein, as these may vary. It is also to be understood that the terminology used herein is used for the purpose of describing particular embodiments only, and is not intended to limit the scope of the embodiments of the invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention.

All patents and other publications discussed are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate or otherwise remove any such publication or patent as prior art for any reason.

Referring now to FIG. 1, certain components of a system 100 for monitoring the drying chamber of a clothes dryer are shown. System 100 comprises a monitoring device 102 and a receiving electronic device 104. The monitoring device 102 may be a monitoring, alert, and learning device that may be placed in the drying chamber 106 that holds clothing to be dried during operation of the dryer. The device 102 may be a free floating and battery operated independent ball or other shape that is placed inside any home or commercial dryer chamber 106, either gas or electric. The device 102 may be automatically activated by motion, and may beacon or otherwise transmit information about the temperature, humidity and/or other parameters, for example, pressure, of the dryer's inner chamber 108 and enclosed clothes while the dryer is operating. The device 102 may also be equipped with an accelerometer or other type of motion sensor to determine when the dryer is in motion or stationary. Data exchange 110 preferably is made between the device and a mobile app interface on a smart phone, tablet, or other electronic device 104 via, for example, Bluetooth low energy (BLE 4.x and planned BLE 5) or other wireless data transfer protocol.

The device 102 may be designed to have an easy twist lock design to allow for access to the internal battery for eventual replacement. The device 102 may have vent holes (e.g. vent holes 404 in FIG. 4) on the top and/or bottom to allow for airflow thru the unit for sampling the chambers environment. The casing of the device 102 may be composed of high temperature polypropylene or other suitable plastic.

An internal printed circuit board ("PCB") and programmable system on chip ("PSoC") or application specific integrated circuit ("ASIC") may output temperature, humidity, accelerometer data, and/or Battery data or combinations thereof. The device 102 may operate in a burst mode at startup to get the best user and app response and least amount of latency at startup. The device 102 may shut down after a determined amount of inactivity, for example, lack of motion, and automatically activate based on motion. The PSoC may be powered through a battery attached to the PCB.

For larger homes or commercial applications a central powered repeater hub 112 (BLe, Wi-Fi, ZigBee, Z Wave, etc.) can be employed to relay global remote messages and extend range beyond the BLe specifications current limitations. This will also allow for scaling the number of users in a densely populated location, for example, in a laundry mat, college dorms, apartment complexes, and the like.

The central hub 112 communicates information 110 received from one or many remote sensor devices 102 and relays the data 110 out to the users via the Internet or other network or data connection. Hub 112 may allow users to receive remote alerts outside of wireless range of the remote sensor devices and also may allow for dense populations of remote sensor devices to be operated by users at the same time.

Figure 2:
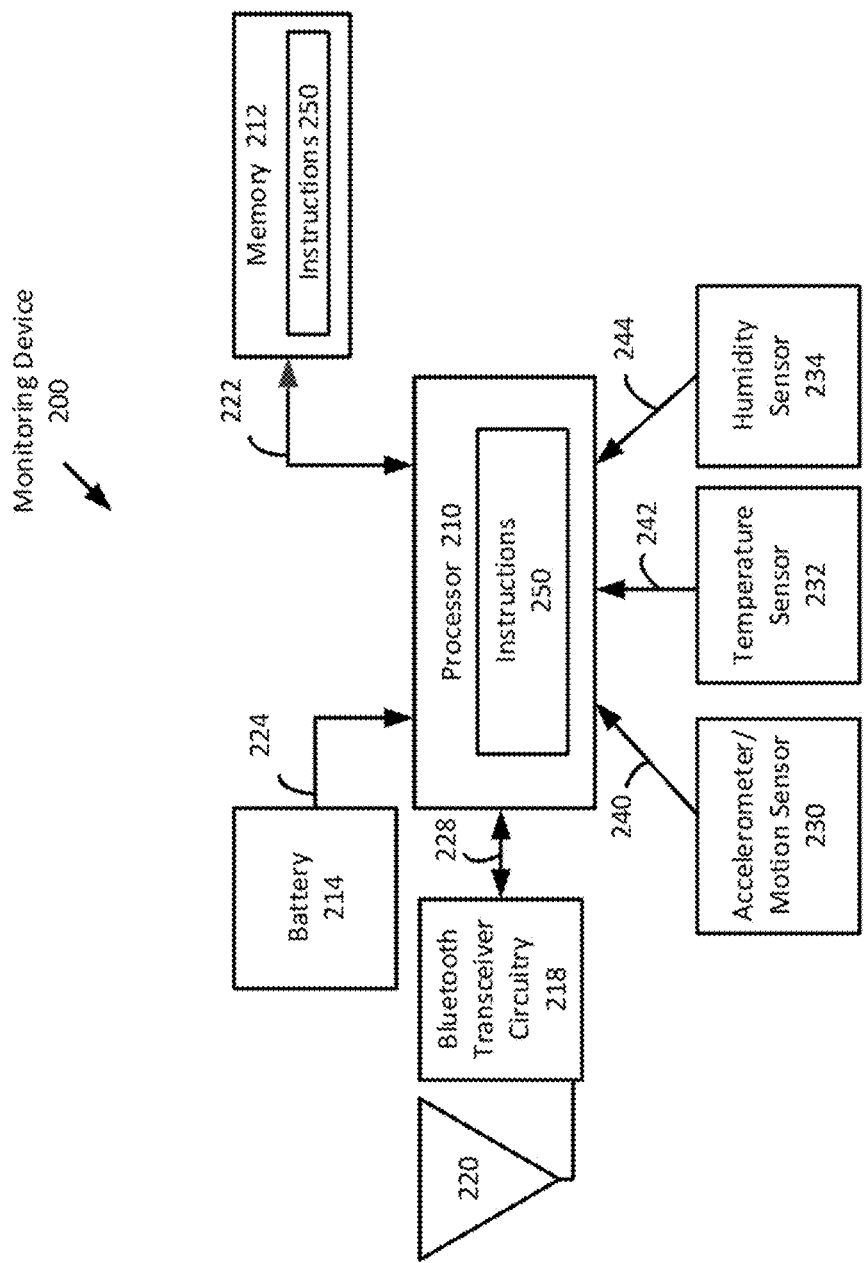
FIG. 2 is a block diagram that shows an example monitoring device.

FIG. 2 provides a diagram of a monitoring device 200. As shown in FIG. 2, the monitoring device 200 includes a processor 210. Monitoring device 200 also includes one or more various sensors, such as, for example, accelerometer/motion sensor 230, temperature sensor 232, and humidity sensor 234 that in communication with processor 210 preferably via communication links for receipt of signals such as, for example, electrical connections 240, 242, 244, respectively. The processor 210 uses the data from the sensors 230, 232, 234 in accordance with the function(s) of the monitoring device 200. A battery 214 may also be connected to processor 210 via a communication link, for example, electrical connection 224. The level of charge of the battery 214 may be may be determined by a sensor (not shown) or by the PSoC, and the level of charge may be transmitted to processor 210

The monitoring device is also enabled to support Bluetooth or other wireless data transmission technology. An antenna 220 is coupled with Bluetooth transceiver circuitry 218 for transmitting and receiving Bluetooth signals. Bluetooth signals may be used to transmit information over a moderate distance. Transmitted information can include sensor data from any one of sensors 230, 232, 234, or combinations thereof, battery charge level received from the battery 214, and the like. The embodiments of the present disclosure are not limited in this regard. The battery may be selected to achieve battery operation of 2 or more years, and may utilize very low power communications PSoC's.

The processor 210 may store the sensor data or battery charge level information in a memory 212 of the monitoring device 200. Accordingly, the memory 212 may be connected to and accessible by the processor 210 through communication links, such as, for example, an electrical connection 222. The memory 212 can be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory. The memory 212 can also have stored therein instructions 250 that may be, for example, stored as firmware. Collectively, the hardware components described above may be formed, attached, or otherwise connected to a PCB and/or PSoC.

As shown in FIG. 2, the instructions 250 can also reside, completely or at least partially, within the processor 210 during execution thereof by the monitoring device 200. In this regard, the memory 212 and the processor 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the monitoring device 200. Monitoring device firmware and hardware may be designed to automatically wake from an inactive or sleep mode, for example, a battery saver mode, by sensing motion using the accelerometer/motion sensor 230. The automatic wake feature adds to ease of use and allows for less user hurdles for quick intuitive operation, for example, by not requiring physical interaction by the user. A green LED may, for example, light up briefly at startup to give the user visual confirmation the dryer ball has activated. An app operating on the user electronic device, such as that described below in reference to FIG. 3, for example, may then begin displaying the wirelessly communicated data.

Figure 3:
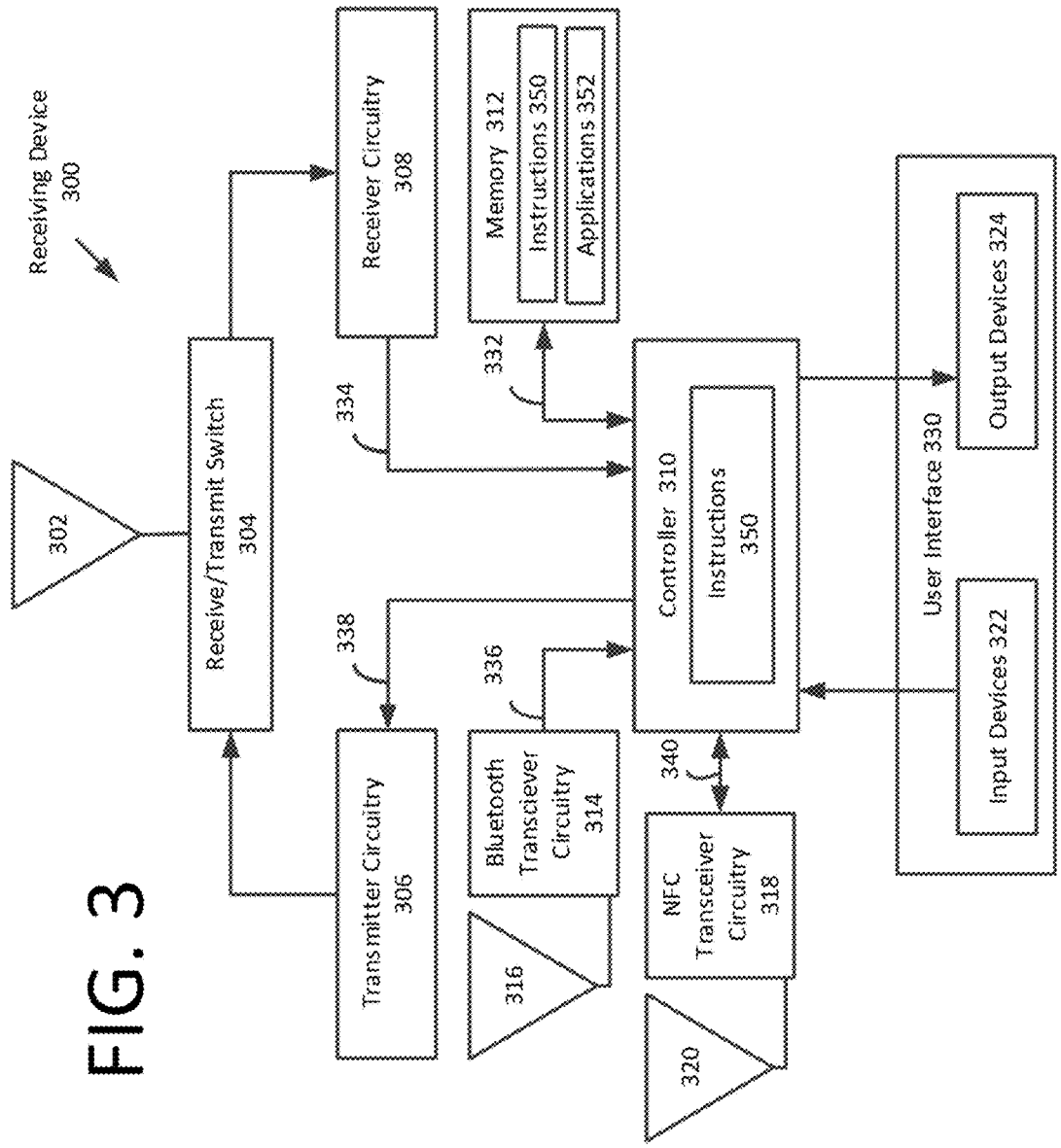
FIG. 3 is a block diagram that shows an example electronic device.

FIG. 3 provides a diagram of a receiving/electronic device 300. As shown in FIG. 3, the receiving device 300 includes an antenna 302 for receiving and transmitting signals, preferably, Radio Frequency (RF) signals. A receive/transmit (Rx/Tx) switch 304 selectively couples the antenna 302 to the transmitter circuitry 306 and receiver circuitry 308 in a manner familiar to those skilled in the art. The receiving device may include receiver circuitry 308 which demodulates and decodes the RF signals received from a network or wireless access point (see hub 112 in FIG. 1, for example). The receiver circuitry 308 is coupled to a controller 310 via a communication or signal link, e.g., an electrical connection 334. The receiver circuitry 308 provides the decoded RF signal information to the controller 310. The controller 310 may use the decoded RF signal information in accordance with and to perform the function(s) of the receiving device 300. The controller 310 also provides information to the transmitter circuitry 306 for encoding and modulating information into RF signals. Accordingly, the controller 310 is coupled to the transmitter circuitry 306 via a communication or signal link, e.g., an electrical connection 338. The transmitter circuitry 306 communicates the RF signals to the antenna 302 for transmission to an external device.

Similarly, the receiving device 300 may be Bluetooth enabled. An antenna 316 is coupled to Bluetooth transceiver circuitry 314 for receiving Bluetooth signals. The Bluetooth transceiver circuitry 314 demodulates and decodes the Bluetooth signals to extract Bluetooth information therefrom. The Bluetooth transceiver circuitry 314 provides the decoded Bluetooth information to the controller 310. As such, the Bluetooth transceiver circuitry 314 is coupled to the controller 310 via a communication or signal link, e.g., an electrical connection 336. Notably, the present invention is not limited to Bluetooth based methods.

The receiving device 300 is also enabled to support Near Field Communication (NFC). An antenna 320 is coupled with NFC transceiver circuitry 318 for transmitting and receiving NFC signals. NFC signals are used to transmit small amounts of information over a short distance by placing the device near another NFC enabled object. The embodiments of the receiving device are not limited in this regard.

The controller 310 may store the decoded RF signal information and the decoded Bluetooth information in a memory 312 of the electronic device 300. Accordingly, the memory 312 is connected to and accessible by the controller 310 through a communication or signal link, for example, electrical connection 332. The memory 312 can be a volatile memory and/or a non-volatile memory. For example, the memory 312 can include, but is not limited to, a Random Access Memory (RAM), a Dynamic Random Access Memory (DRAM), a Static Random Access Memory (SRAM), Read-Only Memory (ROM) and flash memory. The memory 312 can also have stored therein instructions 350 and software applications 352.

The software applications 352 include, but are not limited to, applications operative to provide identity validation services; NFC services; telephone services, network communication services, GPS based services, navigation services, location services, position reporting services, traffic status services, operational information services, commerce services, email services, web based services, and/or electronic calendar services. For example, one or more of software applications 352 may provide feedback on the atmospheric and/or environmental conditions inside the drying chamber. One or more of software applications 352 may alert the user of receiving device 300 when the clothes are dry or need more running time, when the dryer starts or stops via an internal accelerometer, and protect sensitive clothes from damage and shrinkage by monitoring the air temperature in the chamber. One or more of software applications 352 may include self-learning algorithms for learning the temperature and humidity profiles of different gas and electric clothes dryer brands, types, and sizes. The learned profiles can be used to alert of clogged vents, after several cycles the dryers profile is determined and used as a baseline for future alerts for safety, malfunctions, abnormal operation and provide suggestions for improved dryer performance, for example, to clean vents in the event abnormally high heat is consistently reported. All alerts may be user configurable through the user's mobile devices operating system. Alerts can consist of sounds and/or pop up notifications via a mobile operating system of electronic device 300.

As shown in FIG. 3, one or more sets of instructions 350 are also stored in the memory 312. The instructions 350 can also reside, completely or at least partially, within the controller 310 during execution thereof by the receiving device 300. In this regard, the memory 312 and the controller 310 can constitute machine-readable media.

The controller 310 is also connected to a user interface 330. The user interface 330 is comprised of input devices 322, output devices 324, and software routines (not shown in FIG. 3) configured to allow a user to interact with and control software applications 352 installed on the computing device 300. Such input and output devices may include any input/output device which is now known or known in the future. The receiving device is not limited in this regard.

Figure 4:
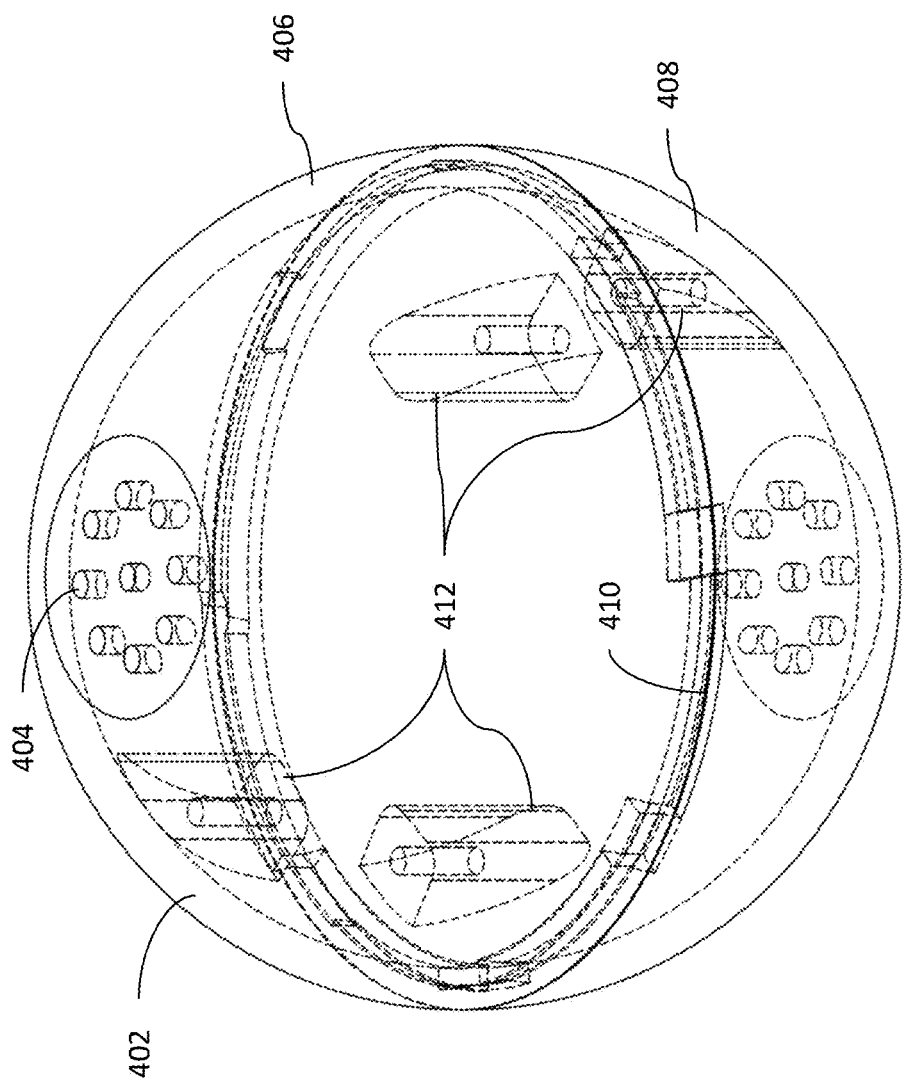
FIG. 4 is a side perspective view of an example casing for a monitoring device.
Figure 5:
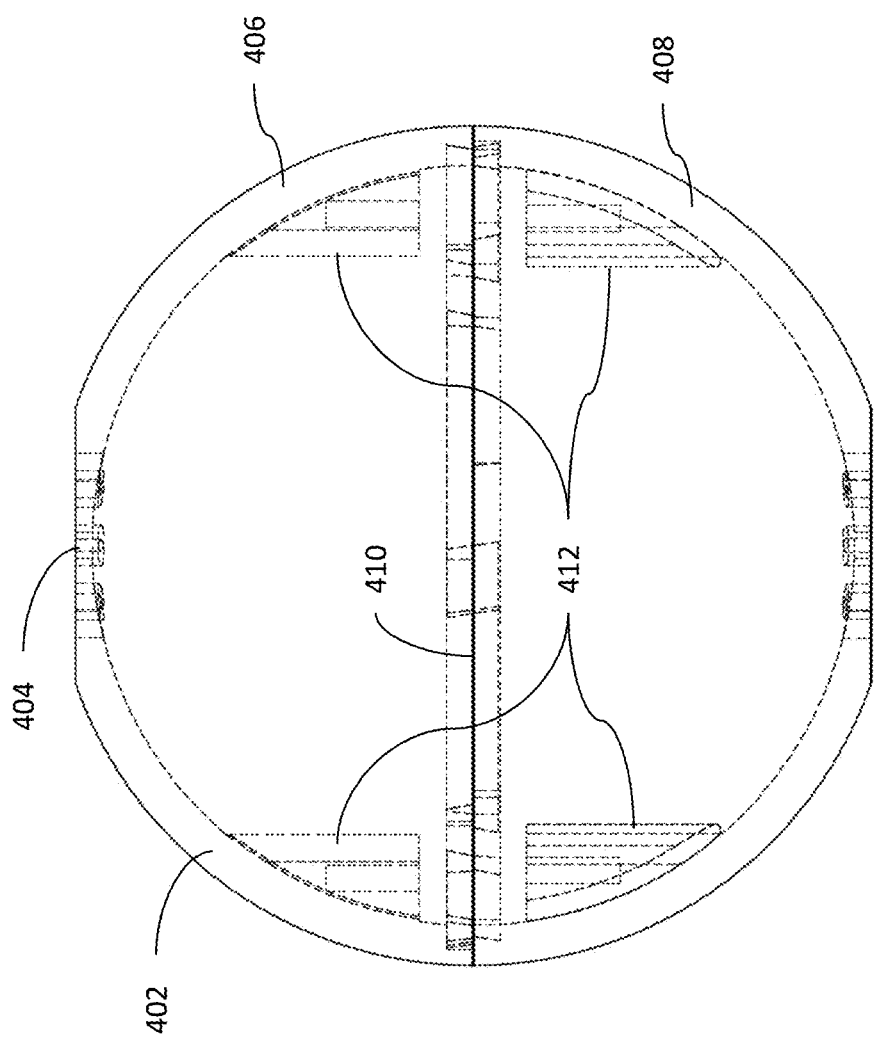
FIG. 5 is a side view of an example casing for a monitoring device.
Figure 6:
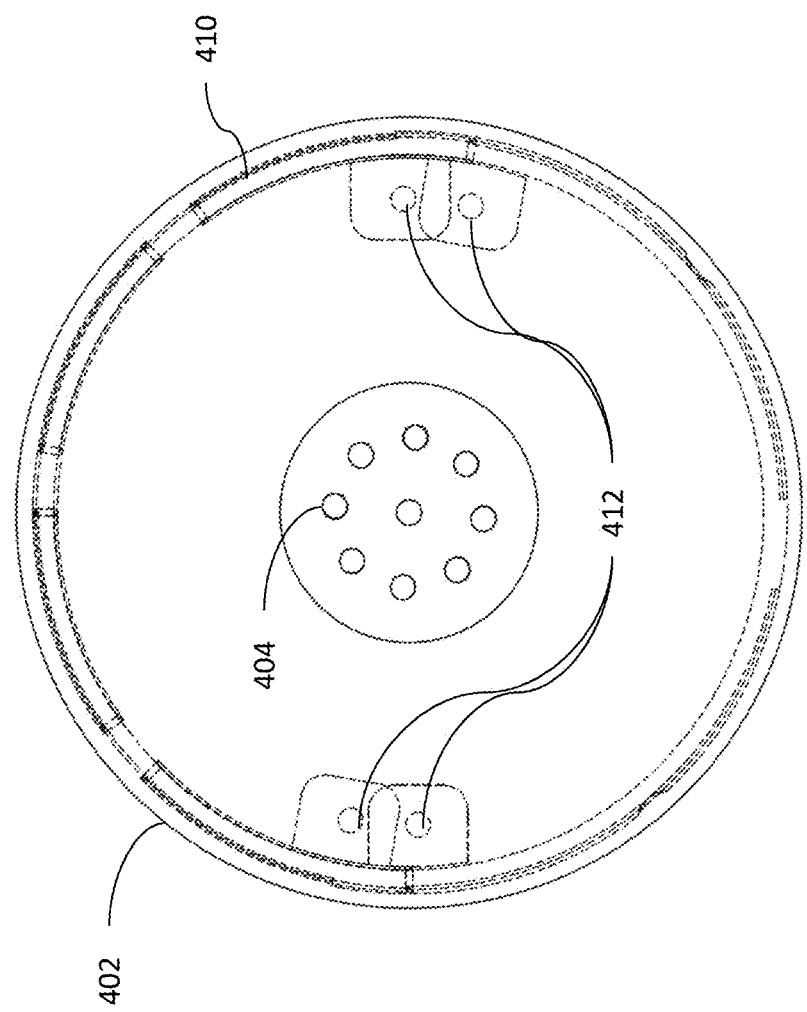
FIG. 6 is a top view of an example casing for a monitoring device.
Figure 7B:
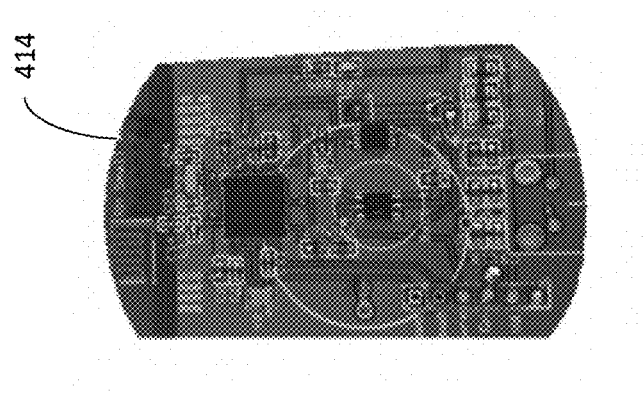
FIG. 7B is an image showing an example printed circuit board adapted to be mounted in a casing.
Figure 7A:
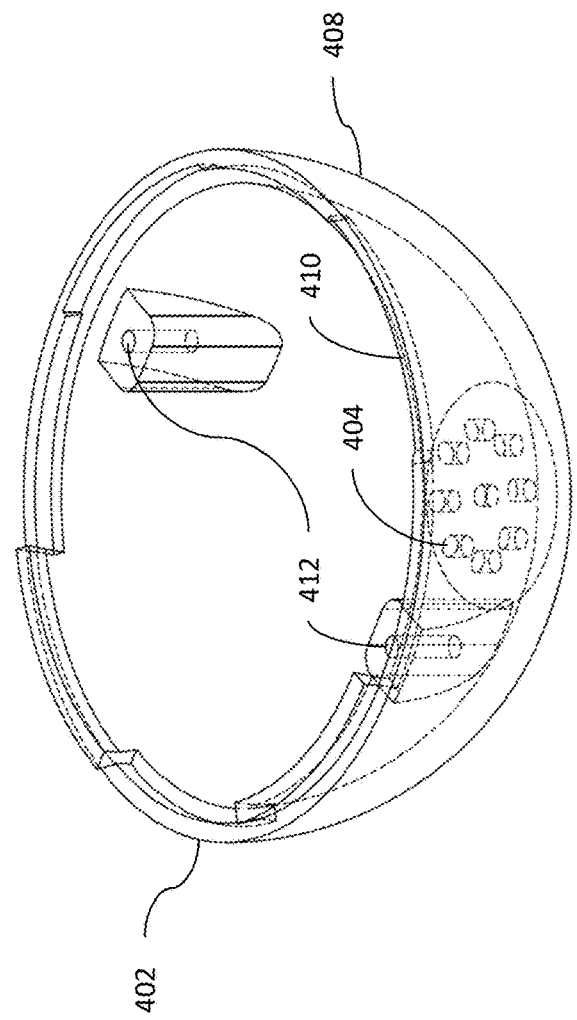
FIG. 7A is a side perspective view of a portion of an example casing for a monitoring device.

FIGS. 4-7 show drawings of an example casing 402 for a monitoring device 102. Casing or housing 402 may have a plurality of holes 404 to permit air to flow from outside casing 402 to inside the casing. Casing 402 may include a top portion 406 and a bottom portion 408 that interlock at a seam 410. Inside casing 402 are mounts 412 upon which a PCB 414 may be attached that includes a PSoC. FIG. 4 shows the top portion 406 and the bottom portion 408 of casing 402 in an assembled state. Inside the casing 402, a PCB 414 may be mounted on mounts 412 that that may include a number of environmental sensors (not shown in FIG. 4). During operation, for example, air may enter the casing through vent holes 404 to allow the environmental sensors to measure conditions in the drying chamber. FIG. 5 shows a side view of the casing assembly. The seam 410, in the example shown in FIG. 5, bisects the assembly. The seam 410 may, for example, include interlocking molding that forms a reusable seal at seam 410.

The flow charts shown in FIGS. 8-14 add further detail to an embodiment of a method of operation of the monitoring device and the wirelessly connected receiving device. While the methods are described for the sake of convenience and not with the intent of limiting the disclosure as comprising a series and/or a number of steps, it is to be appreciated that the process do not need to be performed as a series of steps and/or the stems do not need to be performed in the order shown or described with respect to FIGS. 8-14, but the process may be integrated and/or one or more of the steps may be performed together, or the steps may be performed in the order disclosed or in an alternate order. The boxes with solid outlines are steps that preferably occur in the monitoring device. The boxes with broken outlines are steps that preferably occur in the receiving electronic device.

Figure 8:
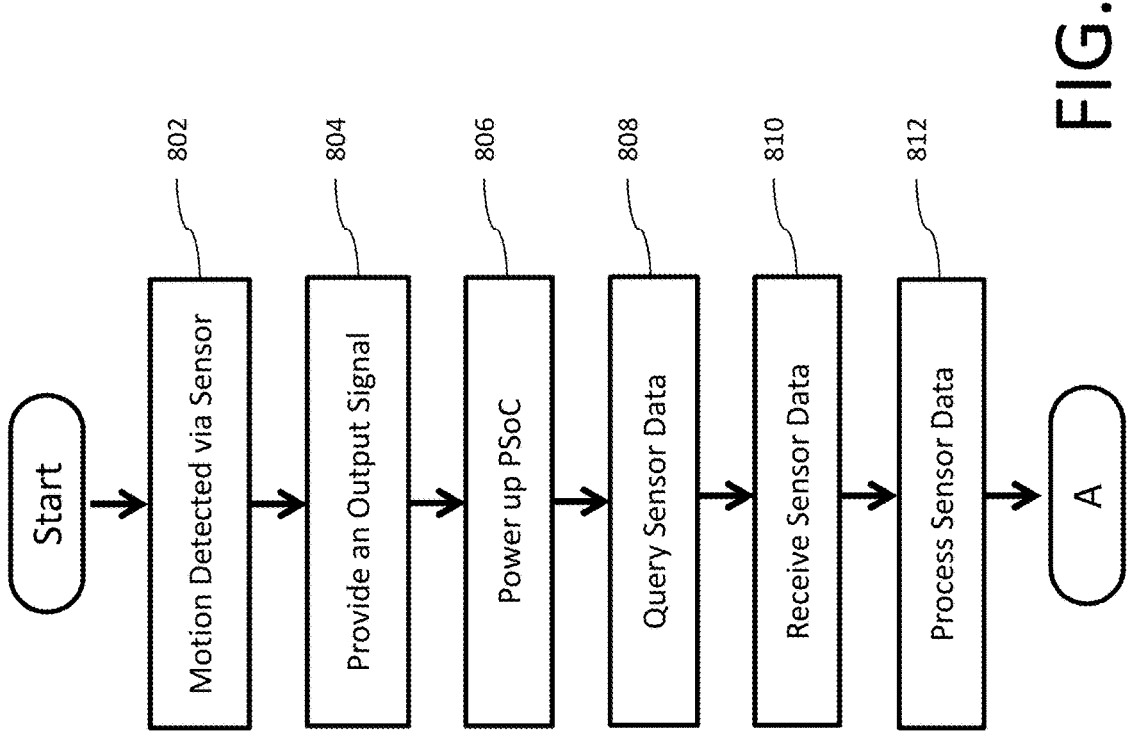
FIG. 8 is a flow diagram that shows an example process for monitoring environmental conditions.

Referring now to FIG. 8, a flow chart is provided that shows one embodiment of a method for detecting motion to start up the monitoring device. At 802, motion is detected via an accelerometer or other motion sensor associated with the monitoring device. At 804, an output signal is generated and provided to the processor in the monitoring device. Upon receipt of the output signal, the processor powers up the rest of the components associated with the monitoring device in 806. In 808, the processor queries the accelerometer or other motion sensor associated with the monitoring device. In 810, the processor receives the motion sensor data and, in 812, the processor associated with the monitoring device processes the motion sensor data to determine the extent of the motion that is causing the motion sensor signal. The process continues in FIG. 9.

Figure 9:
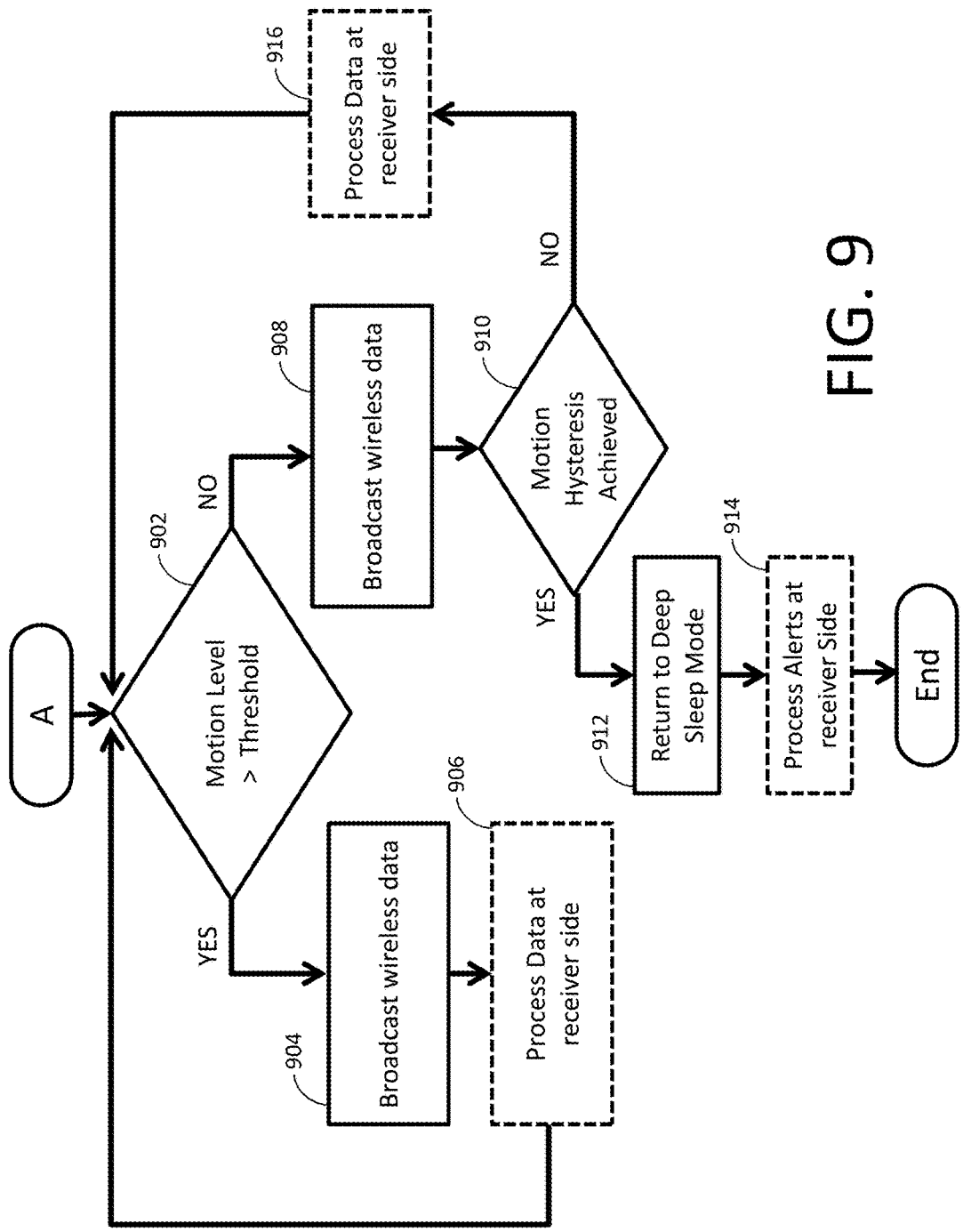
FIG. 9 is a flow diagram that shows an example process for monitoring environmental conditions.

Referring to FIG. 9, the processor determines, in 902 whether the level of motion is above a threshold. The threshold may be selected by the user of the monitoring device and/or the receiving device, or it may be pre-set as part of the firmware embedded in the monitoring device. Preferably, the threshold would be set to a motion level that establishes dryer operation has begun without being unreasonably susceptible to false positives. An example motion threshold is described below in reference to FIG. 17. If the motion level is above the threshold (902: Yes), the data is wirelessly broadcast to the electronic device in 904 and the process in the monitoring device returns to compare the motion level to the threshold in 902. In 906, the receiving electronic device processes the received data and appropriately displays the received data and/or an app interface that indicates the monitoring device is active. If the motion level is below the threshold (902: No), the data is still wirelessly transmitted to the electronic device in 908 but is also further analyzed in 910 to determine whether the reduction in motion indicates that the dryer is no longer in operation and the monitoring device is at rest. If it is determined that the monitoring device is at rest (910: Yes), the processor returns the monitoring device to deep sleep mode in 912 and alerts are processed on the electronic device in 914 to inform the user that the monitoring device has entered deep sleep mode and the process ends. If the monitoring device is not at rest (910: No), data is processed on the receiving electronic device in 916 and the process in the monitoring device returns to compare the motion level to the threshold in 902.

Figure 10:
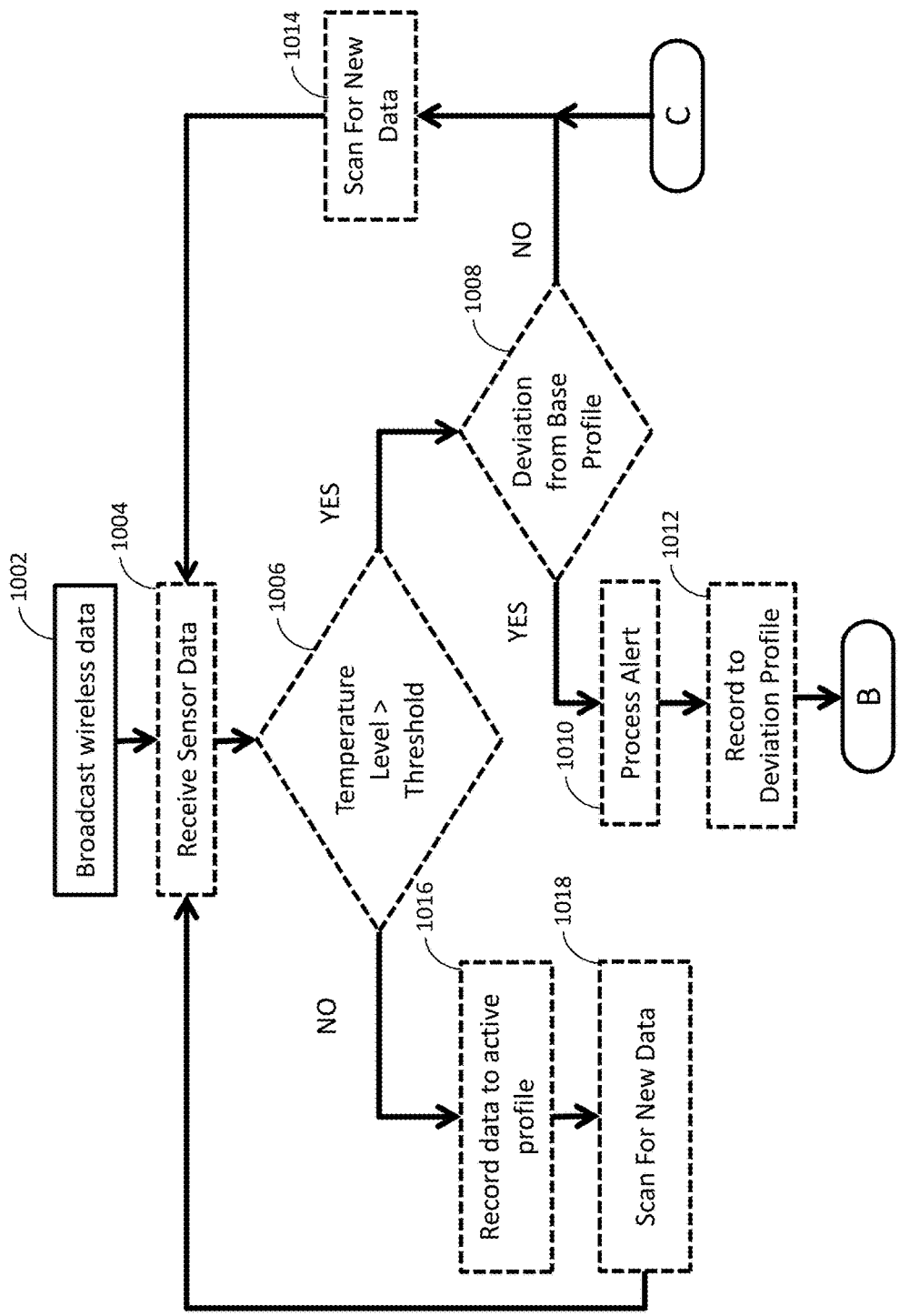
FIG. 10 is a flow diagram that shows an example process for monitoring environmental conditions.
Figure 11:
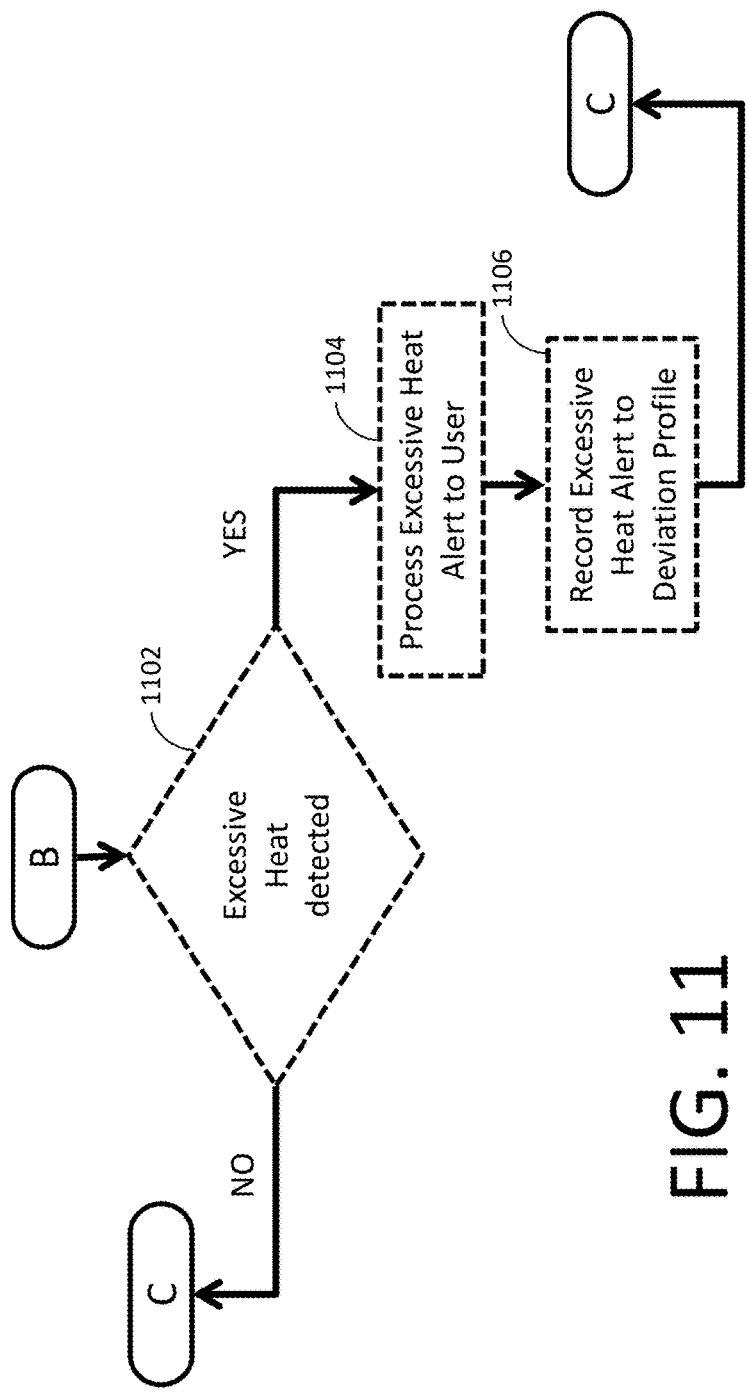
FIG. 11 is a flow diagram that shows an example process for monitoring environmental conditions.

Referring now to FIG. 10, a process for use during the operation of the monitoring device and the receiving device is shown. In 1002, the monitoring device broadcasts sensor data that is received by the user electronic device at 1004. In 1006, the receiving electronic device analyzes the received sensor data to determine if the temperature level in the drying chamber is greater than a threshold temperature. The threshold may be selected by reference to an optimum drying temperature, a maximum safe temperature for the articles in the dryer chamber, or any other user set value. Example temperature threshold values are shown in Table 1. If the temperature is above the threshold (1006: Yes), the sensor data is processed at 1008 to determine whether the temperature represents a deviation from a base profile for the dryer being monitored. If the monitored temperature is a deviation (1008: Yes) then the receiving device processes an alert for the user in 1010. Data may be recorded in a deviation profile in 1012 for the dryer being monitored. This data may be processed for excessive heat detection in a sequence of steps shown in FIG. 11, where it is determined whether an excessive heat threshold has been met in 1102. If excessive heat is detected (1102: Yes) an excessive heat alert is processed and displayed to the user in 1104. In 1106, the excessive heat alert is recorded to the deviation profile. The process then returns to FIG. 10 at point C where, in 1014, the electronic receiving device scans for new data from the monitoring device and returns to 1004. If the temperature reading is not a deviation from the base profile (1008: No), the electronic receiving device scans for new data from the monitoring device in 1014 and returns to 1004 to restart the monitoring process. If, in 1006, the temperature is not above the set threshold (1006: No), the data is recorded to the active profile in 1016. The electronic receiving device then scans for new data in 1018 and returns to 1004 to restart the monitoring process.

TABLE 1

Example Initial Temperature Threshold Values.

| Status | Low value (° F.) | High value (° F.) |
|---|---|---|
| Cool | 55 | 79.9 |
| Warm | 80 | 124.9 |
| Delicate Alert Zone | 125 | 131.9 |
| Hot | 132 | 145 |
| Excessive Heat | 155 | 185 |

Figure 12:
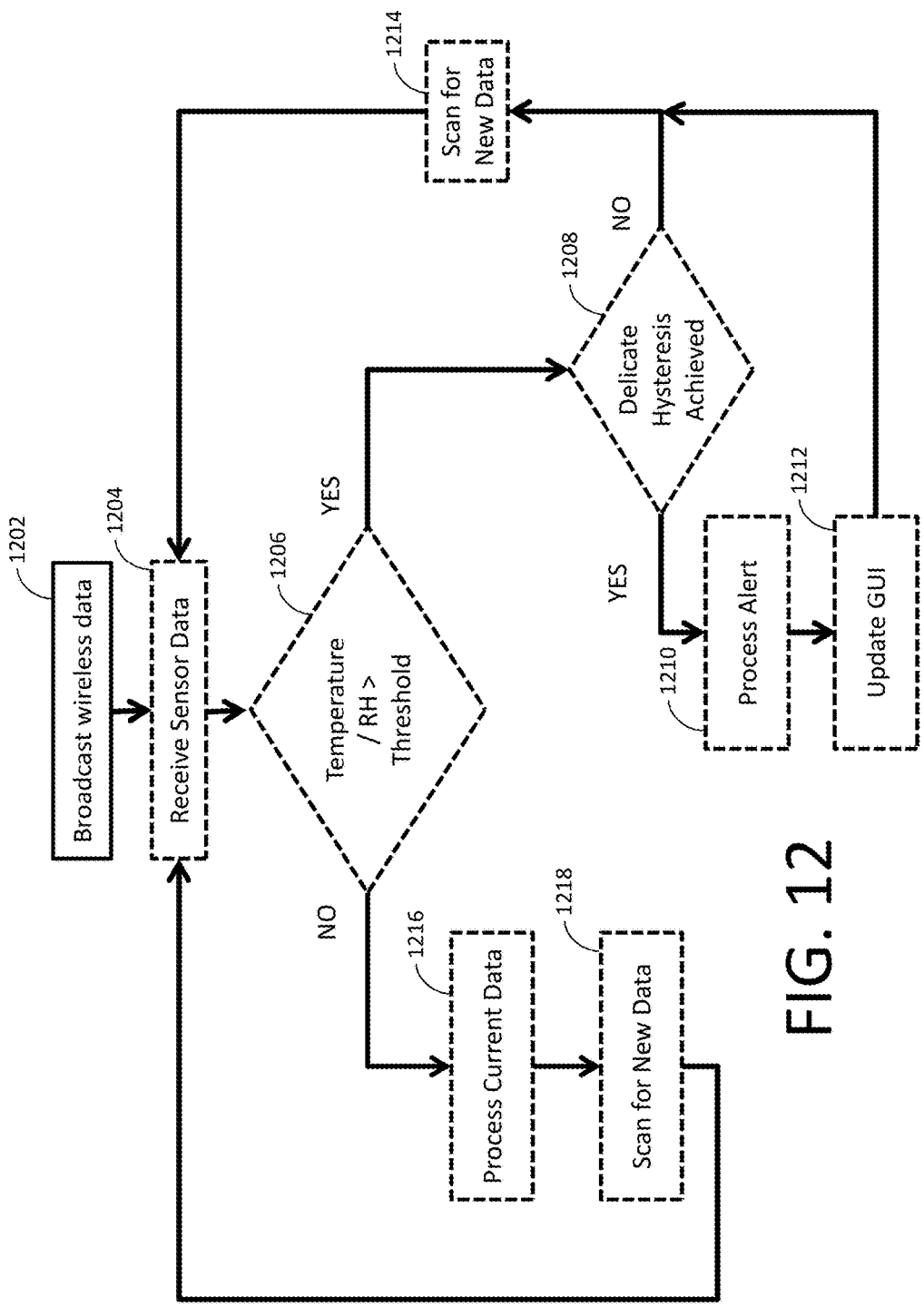
FIG. 12 is a flow diagram that shows an example process for monitoring environmental conditions.

Referring now to FIG. 12, a process for use during the operation of the monitoring device and the receiving electronic device is shown. In 1202, the monitoring device broadcasts sensor data that is received by the user electronic receiving device at 1204. In 1206, the electronic receiving device determines whether data regarding relative humidity and temperature is above a threshold. The threshold may be set based on optimum values related to drying of delicate clothing, for example. If the relative humidity data is above the threshold (1206: Yes), the electronic receiving device receives additional data to perform hysteresis measurements in 1208. This step describes the accumulation of data points that can be greater than or less than the threshold level that initiated the process in 1206, with the purpose of creating a lag in the alerts activation or deactivation, low power mode activation (deep sleep mode), temperature and/or dryness alerts and the like in order to minimize nuisance or high energy operations, along with false alerts to the user. In 1208, it is determined if delicate hysteresis is achieved. If so (1208: Yes), a relative humidity alert is processed in 1210 and the user is notified of the alert via an interface update in 1212. The electronic device then scans for new data in 1214 and returns to 1204 to restart the monitoring process. If delicate hysteresis is not achieved (1208: No) then the electronic device scans for new data in 1214 and returns to 1204 to restart the monitoring process. If the relative humidity and temperature measurement is not above a threshold (1206: No), the data is processed and available for display to the user of the electronic device. The electronic receiving device then scans for new data in 1216 and returns to 1218 to restart the monitoring process.

TABLE 2

Example Initial Dryness Threshold Values. In Dry range user can select "Less Dry, Dry, Very Dry" for fine-tuned preferred level. 0-100 Scale Calculated from RH data read (Dryness = (100 − RH)).

| Status | Dryness Low value (%) | Dryness High value (%) |
|---|---|---|
| Wet | 0 | 39.9 |
| Drying | 40 | 77.9 |
| Almost Dry | 78 | 82.9 |
| Dry | 83 | 100 |

Figure 13:
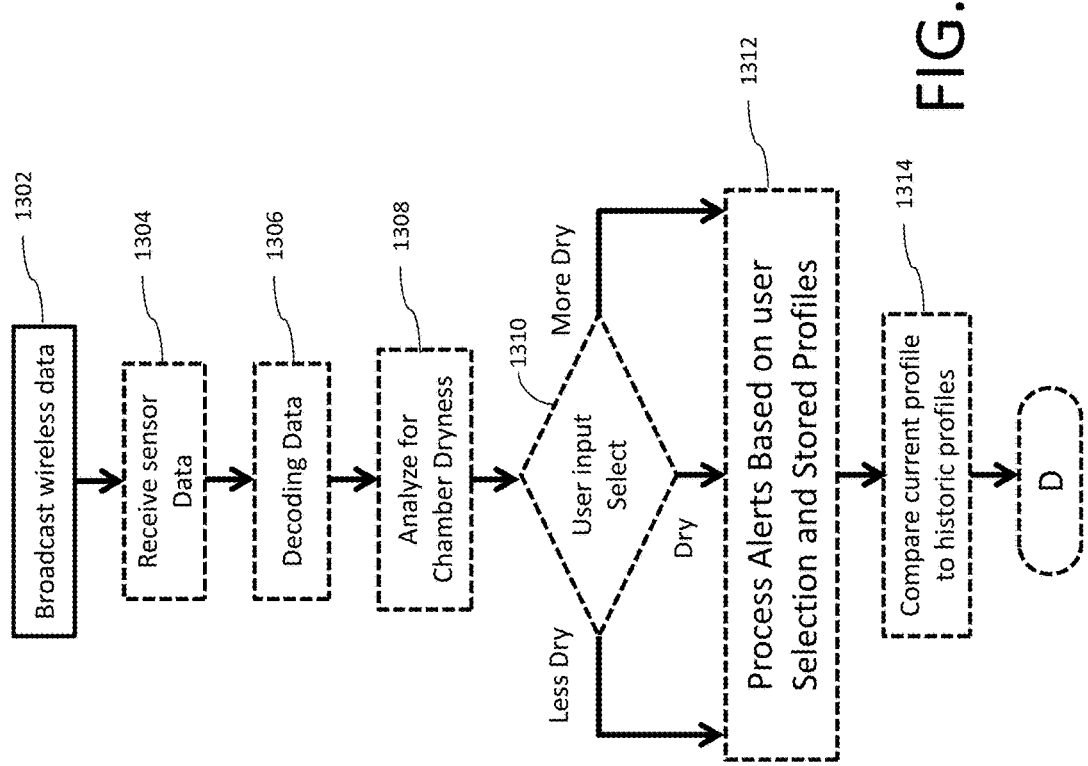
FIG. 13 is a flow diagram that shows an example process for monitoring environmental conditions.
Figure 14:
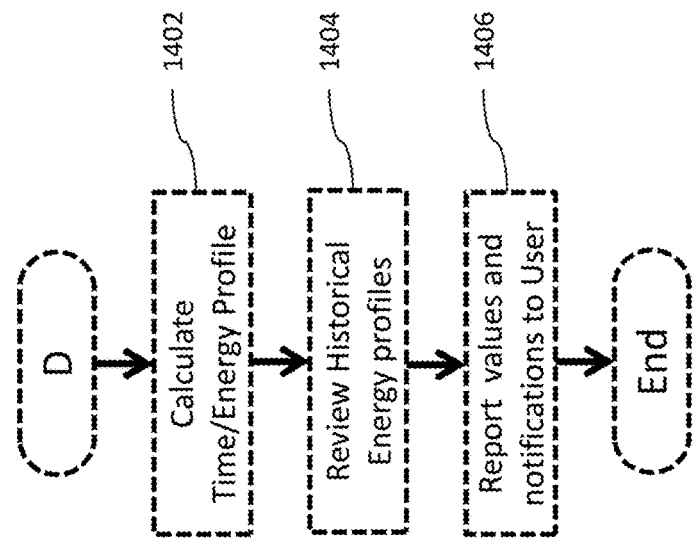
FIG. 14 is a flow diagram that shows an example process for monitoring environmental conditions.

Referring now to FIG. 13, a process for use during the operation of the monitoring device and the receiving electronic device is shown. In 1302, the monitoring device broadcasts sensor data that is received by the user electronic device at 1304. In 1306, data is decoded to allow for further analysis. For example, interlaced data may be decoded, readings may be converted between different unit systems, and the data may be prepared for later analysis. In 1308, the dryer chamber is analyzed for dryness and in 1310 chamber dryness is compared with a user selection, which may be one of more or less dry than a particular dryness level. In 1312, alerts are processed based on user selection and stored profiles. In 1314, the current profile is compared with historic profiles. The process continues in FIG. 14 where a time and energy profile is calculated in 1402 and is compared with historical energy profiles in 1404. The calculated values and any associated notifications are presented to the user in the graphical user interface in 1406.

Component selection is one aspect to the monitoring device's performance inside a high temperature, high vibration sampling environment, such as a drying chamber of a clothes dryer. Most drying chambers are essentially metal drums that present difficulties for wireless transmissions. The disclosed monitoring device preferably utilizes PSoC wireless BLE stack enabled technology, meaning a Programmable system on chip that also include the BLE (Bluetooth low energy) in a single integrated circuit. The BLE stack is programmable into the overall PSoC processor. The unit only needs limited external components and an antenna to operate. The PSoC firmware and BLE stack are software upgradeable. The PSoC may be coupled with high performance components to provide an untethered, physically independent, battery operated, wireless, clothes dryer monitoring device. The normal operation temperature may be between 0° C. and 75° C. (32° F. to 167° F.). However, components of the monitoring device should be capable of withstanding much higher temperatures. Table 3 shows an example set of components with maximum operating temperatures (provided in ° C.).

TABLE 3

| Item | Material | Max Operating (° C.) |
|---|---|---|
| Circuit boards | FR4 | 130 |
| Electronic Components | Mixed IC's | 125 |
| Plastic Case | Polypropylene | 163-180 |
| Battery | BR2032 Lithium 190 mA/hr | 85 |
| PCB conductors | PCB Solder | 183 |

Table 4 shows an example set of materials that provide durability of the monitoring device in a high vibration environment.

TABLE 4

| Item | Material | Purpose |
|---|---|---|
| Coin Cell Battery Holder | Plastics/Metal | Prevent battery from dislodging and generation of intermittent electrical contacts |
| Self-tapping plastic screws | 18-8 SS | Prevent PCB from dislodging |
| Plastic case | Polypropylene | Designed for easy replacement of internal battery but also designed to withstand high temperature and impact hits from the inner chamber walls while rotating |

Figure 15:
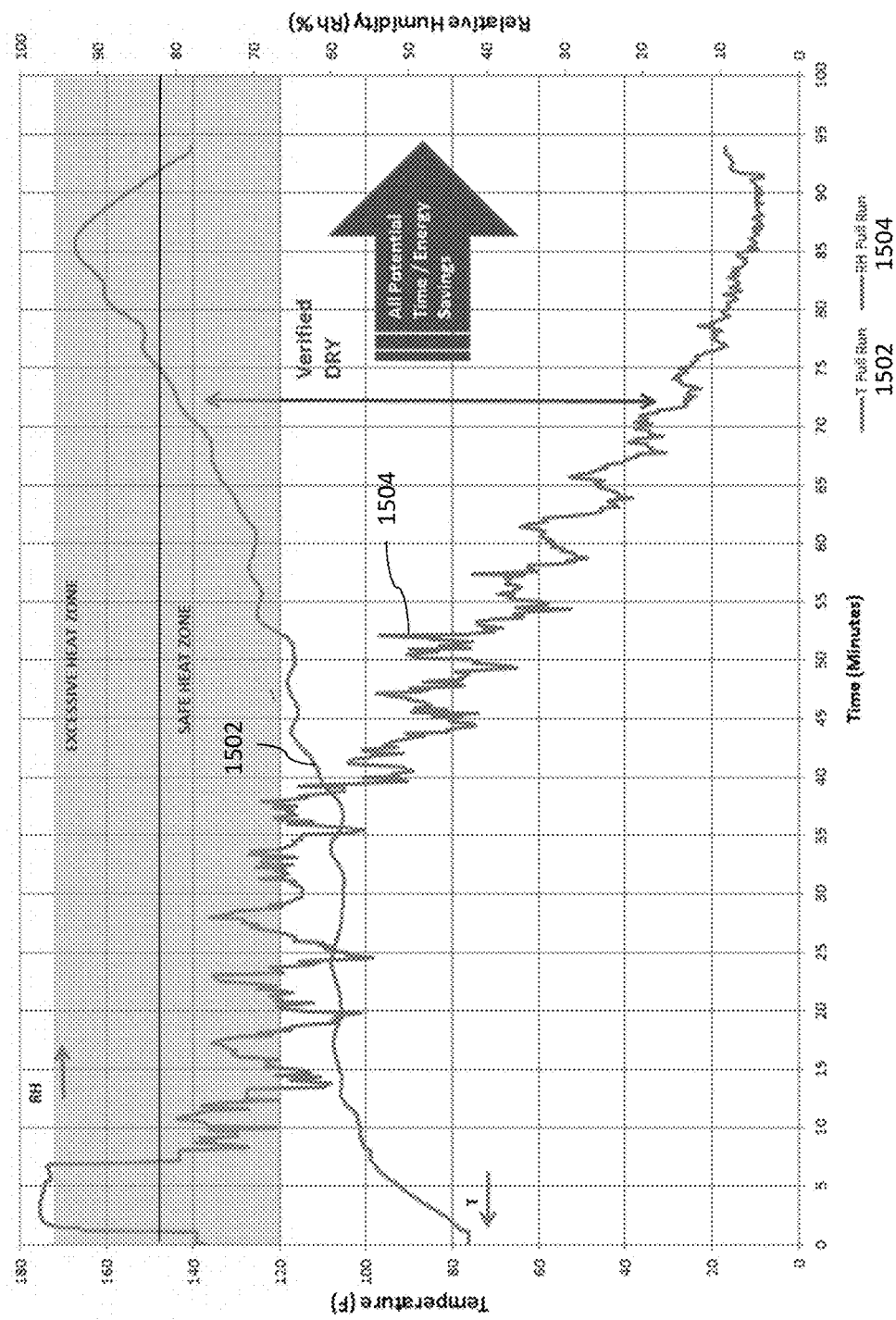
FIG. 15 is a chart showing an example change in relative humidity and temperature in a drying chamber over time.

Test data shows long overruns on standard electric dryer when clothes were already dry. In the graph of FIG. 15, plot 1502 corresponds to temperature over dryer time while plot 1504 corresponds to relative humidity over time. FIG. 15 shows temperate and relative humidity in the chamber of a drier over time and shows excessive heat exposure, the potential time savings, and energy savings from alerting users of when items in the drying chamber are dry and/or motion has stopped. For example, in the example of FIG. 15, at approximately the 70th minute the clothes were dry and had not yet been exposed to excessive heat. After running for another 10 or more minutes, the temperature in the dryer rose to undesirable levels. The additional running to after the 70th minute resulted in wasted energy and unnecessary drying time.

Figure 16:
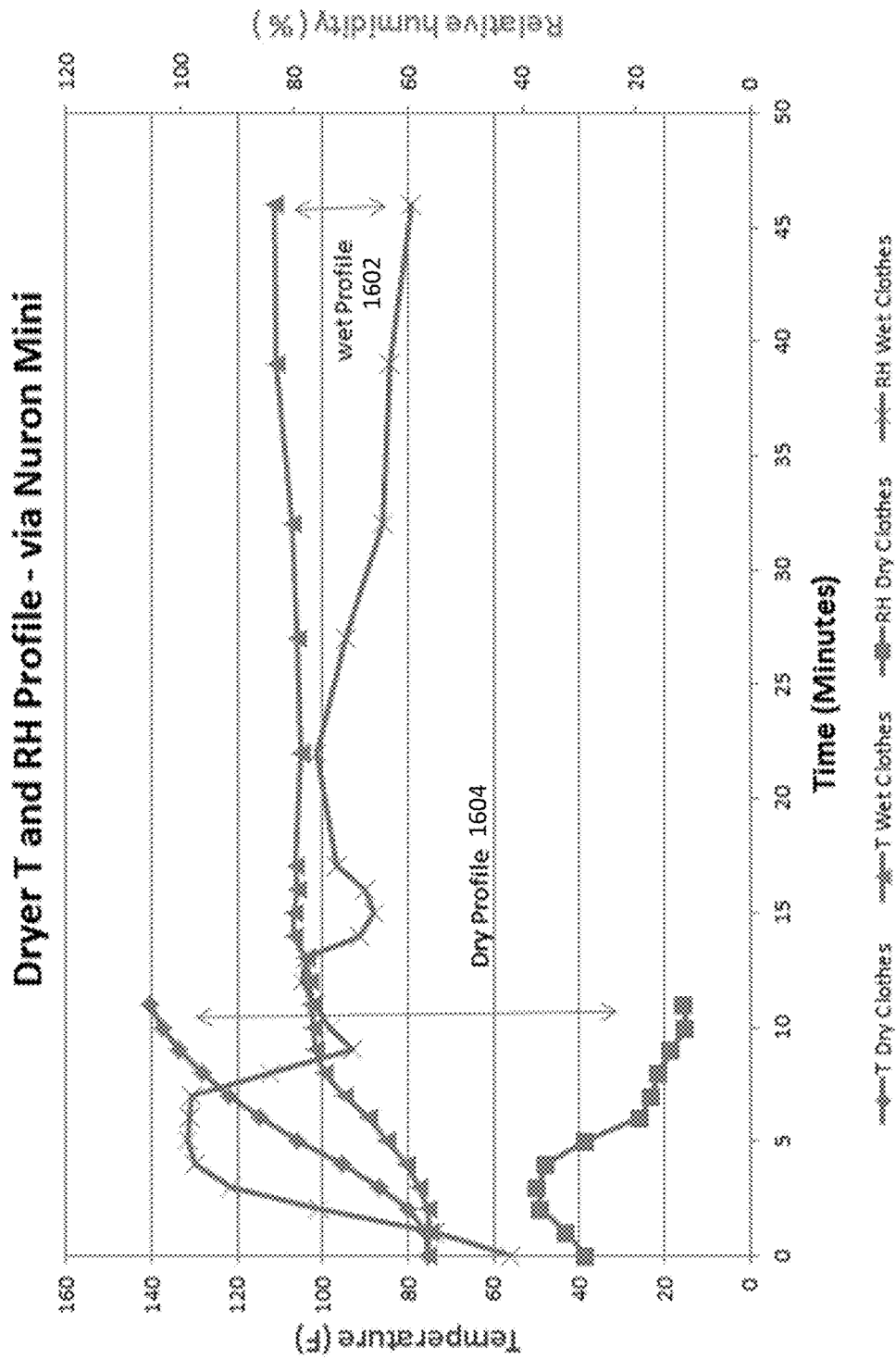
FIG. 16 is a chart showing a comparison between wet and dry item profiles.

FIG. 16 shows an example of in-operation profiles. The wet profile 1602 shows a narrow gap between relative humidity and temperature while the dry profile 1604 shows a much larger gap. These profiles can be generated through learning algorithms and can be used by the monitoring system to produce alerts and introduce efficiencies into the monitoring process.

The remote sensor may also have the capability to log and store temperature, relative humidity, motion level, and battery level data into profiles. These profiles can then be used for informative alert generation, for example, for blocked vent (based on timing and temperature data), to calculate actual and predictive run times, battery life and remaining life, load sizes (based on motion data), energy savings (based on run times), dryness (based on RH data), and delicate alerts (based on temperature data).

The profiles for each parameter may include of a "baseline" profile (historical average of high confidence values for the relevant measurement) that may be used as a control and reference data set. An "active" profile will be the current dataset that is characterizing the current operational run. Based on comparisons to the baseline of the user's equipment, accurate predictive measures can be made regarding possible runtimes, time to dry, time and energy savings, battery replacement requirements, and the like. A "deviation" profile may be generated if the data set deviates from the normal baseline average. This profile can be used to record current and prior deviations that provide feedback to calculations for potential clogged vents, possible excessive heats conditions. If these deviations persist they can be used to generate alerts to possible equipment malfunctions.

Figure 17:
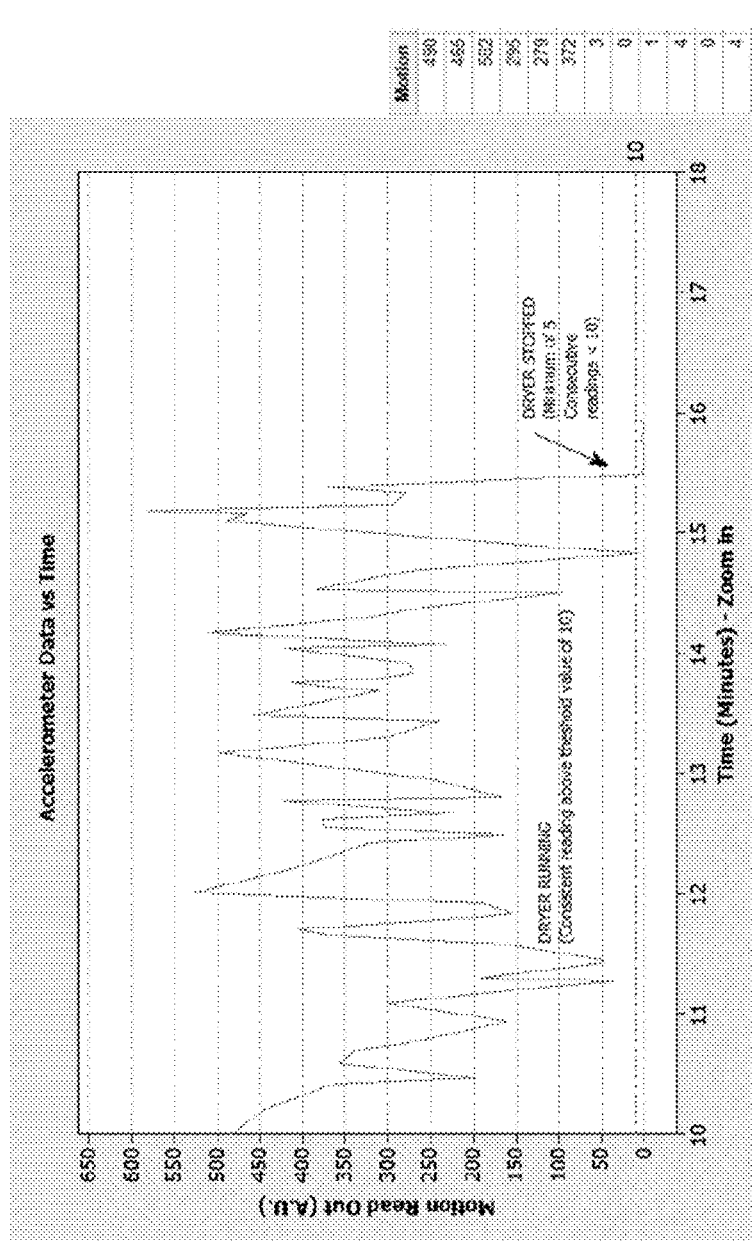
FIG. 17 is a chart showing data from a motion sensor associated with a remote sensing device that is in operational use.

Referring now to FIG. 17, an example of a motion threshold is shown. Motion is measured by reading an arbitrary unit of movement from a motion sensor leading to a data count. When a remote sensor device is in operation, starting on the left side of the chart shown on FIG. 17, the arbitrary unit reading is usually above 50, often substantially above 50, with most readings between 250 and 500. Using historical data, a threshold of 10 was selected. A consistent level of motion above 10 indicates the remote sensing device is in a dryer that is operation. As shown on the right side of the chart shown in FIG. 17, a minimum of five consecutive readings of less than 10, for example, may indicate that the dryer has stopped.

Figure 18:
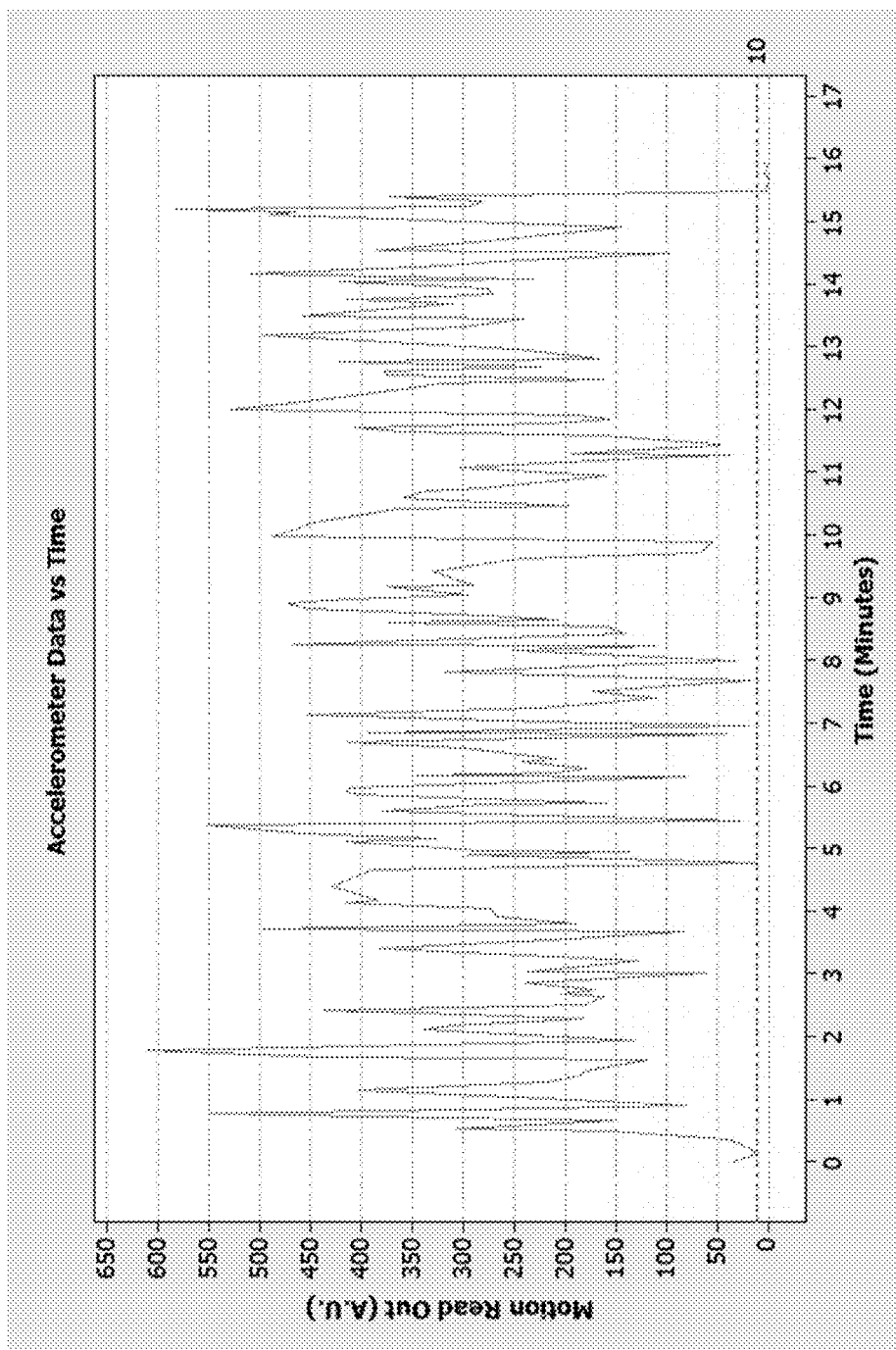
FIG. 18 is a chart showing data from a motion sensor associated with a remote sensing device that is in use for the purpose of determining a power threshold.

FIG. 18 shows experimental data analysis of motion values to establish thresholds values and to tune algorithms in order to minimize nuisance alerts for "Stopped" dryer notifications. For example, a threshold may be a value that the sensor rarely returns when the remote sensor device is in motion. As shown in this example, the motion level rarely falls below 10. In contrast, the sensor motion level is always below 10 when the remote sensor device is not in motion, as can be seen on the right side of the chart. In operation, the sensor is activated and sends power on signal to PSoC when any one data point goes above the initial threshold value which can be tuned by the user. In this example it is 10.

What is claimed:
1. A remote sensor device comprising:
a casing having an internal cavity and composed of a material that maintains rigidity in temperatures up to at least 185 degrees Fahrenheit; and
an electronic circuit mounted within the internal cavity of the casing and that operates in temperatures up to at least 185 degrees Fahrenheit, the electronic circuit comprising:
at least one environmental data sensor that generates environmental data based on one or more environmental conditions of air inside a chamber of a clothes dryer and immediately surrounding the remote sensor device;
a processor;
a replaceable battery and a battery charge sensor that determines a level of charge of the battery and generates battery charge level data based on the level of charge;
a wireless transmitter; and
a programmable memory storing program instructions that, when executed, cause the processor to:
process environmental data generated by the at least one environmental sensor;
transmit the environmental data via the wireless transmitter to a receiving device for comparison against one or more historical profiles comprising historical environmental conditions inside the chamber;
process the battery charge level data generated by the battery charge sensor; and
transmit the battery charge level data via the wireless transmitter to the receiving device for display.
2. The remote sensor device according to claim 1, wherein the environmental data is selected from a group consisting of: temperature data, humidity data, and combinations thereof.
3. The remote sensor device according to claim 1, wherein the electronic circuit further comprises a motion sensor, and wherein the program instructions, when executed, further cause the processor to:
determine, using data generated by the motion sensor, whether the remote sensor device is in motion;
enter a deep sleep mode when the measurable motion is below a threshold level of motion;
maintain the deep sleep mode in response to the motion of the remote sensor device remaining below the threshold level of motion; and
exit the deep sleep mode and enter an active mode in response to the motion being at or above a threshold level of motion.
4. The remote sensor device according to claim 3, wherein the wireless transmitter is not powered when the remote sensor device is in the deep sleep mode.
5. The remote sensor device according to claim 1, wherein the casing comprises two interlocking parts.
6. The remote sensor device according to claim 1, wherein the casing includes a plurality of holes that allow air surrounding the remote sensor device to flow into the internal cavity of the casing.
7. A method of monitoring environmental conditions inside a chamber of a clothes dryer, the method comprising:
placing a remote sensor device inside the chamber, wherein the remote monitoring device includes at least one environmental data sensor and a motion sensor;
detecting, by the motion sensor, motion of the remote monitoring device;
if the motion is above a threshold level, changing the remote sensor device from a deep sleep mode to an active mode;
applying power, from a replaceable battery associated with the remote sensor device, to the at least one environmental data sensor, wherein the replaceable battery is in communication with a battery charge sensor that determines a level of charge of the battery and generates battery charge level data based on the level of charge;
receiving, from the environmental data sensor, environmental data based on one or more environmental conditions of air immediately surrounding the environmental data sensor;
receiving, from the battery charge sensor, battery charge level data; and
wirelessly transmitting the environmental data and the battery charge level data via a wireless transmitter associated with the remote sensor device to a receiving device that enables a user of the receiving device to monitor the environmental conditions inside the chamber, wherein the environmental data received by the receiving device is compared to historical profiles of environmental conditions inside the chamber.
8. The method according to claim 7, wherein the environmental data is selected from at least one of a group consisting of: temperature data, humidity data, and combinations thereof.
9. The method according to claim 8, further comprising relaying the wirelessly transmitted environmental data through a hub device that is in communication with the remote sensor device and the receiving device.
10. The method according to claim 8, further comprising calculating a relative humidity of the air immediately surrounding the remote sensor device based on the environmental data received by the receiving device.
11. The method according to claim 10, further comprising determining whether a temperature of the air immediately surrounding the remote sensor device is at or above a threshold temperature.
12. The method according to claim 11, further comprising determining whether a temperature of the air immediately surrounding the remote sensor device exceeds a maximum temperature, wherein the maximum temperature is set to avoid damage to articles that are included inside the enclosed chamber or to the remote sensor device.
13. A system for monitoring environmental conditions inside a chamber of a clothes dryer, the system comprising:
a remote sensor device configured to monitor the environmental conditions inside the chamber and that is physically independent from the chamber, the remote sensor device comprising:
a casing having an internal cavity and composed of a material that maintains rigidity in temperatures up to at least 185 degrees Fahrenheit;
a replaceable battery and a battery charge sensor that determines a level of charge of the battery and generates battery charge level data based on the level of charge;
at least one environmental data sensor that generates environmental data based on one or more environ- mental conditions of air immediately surrounding the environmental data sensor; and a wireless transmitter configured to wirelessly transmit environmental data generated by the at least one environmental data sensor and battery charge level data generated by the batter charge sensor; and a receiving device comprising a processor configured to receive the wirelessly transmitted environmental data and battery charge level data from the remote sensor device and to enable a user of the receiving device to monitor the environmental conditions inside the chamber, wherein the environmental data received by the receiving device is compared to historical profiles of environmental conditions inside the chamber.

14. The system according to claim 13, wherein the remote sensor device further comprises a motion sensor that enables the remote sensor device to:

determine, using data generated by the motion sensor, whether the remote sensor device is in motion;

enter a deep sleep mode in response to the motion being below a threshold level of motion;

maintain the deep sleep mode of remote sensor device in response to the motion of the remote sensor device remaining below the threshold level of motion; and exit the deep sleep mode and enter an active mode in response to the motion being at or above a threshold level of motion.

15. The system according to claim 13, wherein the environmental data is selected from at least one of the group consisting of: temperature data, humidity data, and combinations thereof.

16. The system according to claim 15, wherein the processor of the receiving device is further configured to determine whether a temperature of the air immediately surrounding the remote sensor device exceeds a maximum temperature, wherein the maximum temperature is at least 125 degrees Fahrenheit.

17. The system according to claim 16, wherein the maximum temperature is at least 155 degrees Fahrenheit.

18. The system according to claim 15, wherein the sensor senses moisture content of the air surrounding the sensor and the processor of the receiving device is further configured to calculate a relative humidity of the air immediately surrounding the remote sensor device based on the environmental data received by the receiving device.

19. The system according to claim 15, wherein the sensor senses temperature and the processor of the receiving device is further configured to determine whether a temperature of the air immediately surrounding the remote sensor device is at or above a threshold temperature.

20. The system according to claim 13, further comprising a hub device that is in communication with the remote sensor device and the receiving device, wherein the hub device.

* * * * *